United States Patent [19]

Nayar et al.

[11] Patent Number: 5,614,039
[45] Date of Patent: Mar. 25, 1997

[54] ARGON EMPLOYING HEAT TREATING PROCESS

[75] Inventors: Harbhajan S. Nayar, New Providence; John J. Dwyer, Jr., Edison; Neeraj Saxena, New Providence, all of N.J.

[73] Assignee: The BOC Group, Inc., Murray Hill, N.J.

[21] Appl. No.: 536,015

[22] Filed: Sep. 29, 1995

[51] Int. Cl.⁶ .................................................. C21D 9/00
[52] U.S. Cl. .................... 148/606; 148/627; 148/633; 148/634; 148/669; 148/668
[58] Field of Search .................................. 148/606, 627, 148/633, 634, 669, 668

[56] References Cited

U.S. PATENT DOCUMENTS 2,992,147  4/1957  Hayes .
3,615,904  10/1971  Kindlimann et al. .
4,154,629  5/1979  Asai et al. .
4,473,412  9/1984  Maruhashi et al. .
4,812,177  3/1989  Maehara et al. .
5,137,586  8/1992  Klink ..................................... 148/634
5,167,735  12/1992  Jurmann .
5,259,935  11/1993  Davidson et al. .
5,456,773  10/1995  Bittner et al. .......................... 148/633

*Primary Examiner*—Deborah Yee
*Attorney, Agent, or Firm*—R. Hain Swope; Salvatore P. Pace

[57] ABSTRACT

Method for heat treating a metal in which argon gas is selectively injected into the cooling zone of a heat treating apparatus when the temperature therein is above the level at which significant nitriding will occur.

17 Claims, 4 Drawing Sheets

ARGON EMPLOYING HEAT TREATING PROCESS

TECHNICAL FIELD

The present invention is directed to a method of heat treating metals in a reducing atmosphere with the selective use of argon in at least the cooling zone of the heat treating apparatus. The present method reduces nitriding of the metal, lowers the cost of the process and allows for less heat generation at the exit ends of the heat treating apparatus.

BACKGROUND OF THE INVENTION

The heat treatment (e.g. brazing, annealing, sintering etc.) of metals and alloys is most typically carried out at temperatures above 1000° F. in an atmosphere containing both an inert and a reducing gas. Typically nitrogen ($N_2$) is the inert gas and hydrogen ($H_2$) is the reducing gas. The metal is first preheated in an inert atmosphere such as nitrogen with or without a small amount of hydrogen. The metal is then sent to a reaction zone where it is heat treated to the desired final temperature. The heat treated metal is then sent to a cooling zone, again containing an inert atmosphere such as nitrogen with or without small amounts of hydrogen. Nitrogen's only function is to keep air out of the interior or tunnel of the furnace through which the metal to be heat treated travels. Hydrogen is both a reducing gas and, like nitrogen, keeps air out of the furnace tunnel. The total amount of nitrogen and hydrogen required to keep air out of the furnace is primarily determined by the geometry and dimensions of the furnace tunnel and the size of the opening at each end.

All such atmospheres contain small amounts of impurities such as oxygen and moisture. These impurities react with the metals at above about 1000° F. to produce unwanted surface metal oxides. This problem is usually corrected by increasing the proportion of hydrogen in the atmosphere while still maintaining the same total nitrogen and hydrogen atmosphere flow i.e. by increasing hydrogen and decreasing nitrogen.

Such heat treating processes suffer from one key disadvantage. Although nitrogen is clearly the most preferred inert gas, nitrogen tends to induce nitriding of the metal. It is extremely harmful to nitrogen-sensitive materials such as stainless steels, titanium or titanium containing alloys, refractory metals and materials containing refractory metals such as tungsten, vanadium, etc. Nitriding is the process by which layers of metal nitrides are formed on the surface of the metal as it reacts with nitrogen in the atmosphere at a temperature above some minimum temperature specific to the metal being heat treated. For most common metals, the minimum temperature for nitriding is about 1000° F. Nitriding decreases corrosion resistance and toughness of the metal and produces an aesthetically unappealing dull/matte finish.

A method of addressing the nitriding problem is to heat treat metals with 100% hydrogen throughout the inside length of the furnace i.e. in the absence of nitrogen. However, this method suffers from a number of disadvantages. First, hydrogen is 3 to 5 times more expensive than nitrogen. Second, more heat is generated as escaping hydrogen is burnt at both ends of the furnace. This excess heat causes discomfort to operators working near the ends of the furnace. Third, the metal parts get reheated and oxidized as they exit the furnace under the flame where escaping hydrogen is burnt. Fourth, excess hydrogen usage in the furnace makes the operation inherently less safe. Fifth, 100% hydrogen may be detrimental to certain furnace components such as globars, belts, curtain materials, etc. Sixth, 100% hydrogen may adversely affect the heat treating operation itself; for example, during the brazing of metals, excess hydrogen may cause unwanted flow of filler metals (e.g. flashing).

Some of these disadvantages can be reduced by zoning the furnace atmosphere i.e. introducing 10 to 15% by volume nitrogen near each end of the furnace where the temperature is below about 1000° F. At such low temperatures, there is little if any nitriding. The balance of the total atmosphere is still hydrogen and is introduced in the hot or reaction zone of the furnace. This substantially reduces the nitriding problem. However, 70 to 80% of the total atmosphere is still hydrogen. This is still too high an amount of hydrogen and therefore suffers from the disadvantages listed previously. It is desirable to reduce the overall hydrogen percentage to well below 50% by volume and in some cases well below 30%. If the amount of nitrogen introduced into the ends of the furnace is increased to 25% or more by volume to reduce the hydrogen content, then nitriding will take place to an undesirable degree.

Another possible solution is to keep the amount of nitrogen on either end of the furnace below about 15% of the total atmosphere and dilute hydrogen in the reaction zone with argon. Depending upon the amount of argon used, overall hydrogen can be brought down to desirable levels e.g. below 30% without losing the ability of hydrogen to reduce surface oxides. However, this method suffers from one key disadvantage i.e. the overall cost is too high as argon is 2–4 times more expensive than hydrogen which in turn is 3–5 times more expensive than nitrogen. Accordingly, industry has not favored the use of argon as described in the method above.

It would be a significant advance in the art of heat treating metals if a process could be devised in which the nitrogen level is lowered sufficiently in the reaction zone to avoid nitriding yet the overall cost of the process remains within commercially acceptable limits. It would be an even more significant advance if the process could be devised to both lower nitriding and still keep the overall hydrogen levels well below 50% by volume of the total atmosphere.

SUMMARY OF THE INVENTION

The present invention is directed to a heat treating method in which nitrogen and argon are selectively employed to prevent significant nitriding while performing the process at costs normally associated with prior heat treating methods. The present invention is especially effective in heat treating nitrogen-sensitive metals such as stainless steels, titanium-containing alloys and refractory metals. The term "significant nitriding" shall mean an amount of nitriding which adversely affects the quality and/or the function of the heated treated metal.

The present heat treating method in its broadest aspects involves conducting the cooling stage in nitrogen or argon depending on whether the temperature is below or above the temperature at which significant nitriding occurs. In particular the heat treating method of the present invention comprises:

a) preheating the metal in a preheating zone of a heat treating apparatus;

b) passing the preheated metal to a reaction zone and heating the preheated metal to a temperature of at least 1000° F. in an atmosphere substantially free of nitrogen; and c) cooling the heated metal in a cooling zone of the heat treating apparatus while injecting substantially only argon into the cooling zone when the temperature is above the temperature at which the metal will undergo significant nitriding and injecting substantially only nitrogen when the temperature is below the temperature at which the metal will undergo significant nitriding.

In accordance with another aspect of the present invention, both the preheating and cooling stages of the heat treating process are performed in a manner such that when the temperature is above the temperature at which significant nitriding will occur then argon gas is injected. If the temperature is below the temperature at which nitriding will occur then the process is conducted in the presence of nitrogen. Thus, argon is used in the atmosphere when the temperature exceeds the temperature at which significant nitriding can occur while nitrogen is used, because of its lower cost, when significant nitriding is not likely to occur.

BRIEF DESCRIPTION OF THE DRAWINGS

The following drawings are illustrative of embodiments of the invention and is not intended to limit the invention as encompassed by the claims forming part of the application.

DETAILED DESCRIPTION OF THE INVENTION

The selective use of argon and nitrogen in the cooling zone of the heat treating system and optionally in the preheating and reaction zones substantially avoids nitriding while allowing control over the reducing power in the reaction zone. Since the temperature of the reaction zone is independent of the composition of the atmosphere, it is the relative amount of the reducing gas in the reaction zone that determines the reducing power of the atmosphere. In addition, the present process, despite using relatively expensive argon gas, is cost efficient as compared with conventional processes.

The present invention selectively injects nitrogen/argon into the cooling zone of the heat treating process based upon the likelihood that significant nitriding will take place. In cooling operations if the temperature rises above the minimum temperature at which nitriding will take place (e.g. 1000° F.), then argon will be injected therein. Conversely, if in the cooling operation the temperature is low enough so that significant nitriding will not take place, then less costly nitrogen will be injected therein. As a result of the present process significant nitriding is avoided and the heat treating process is operated in an efficient and economic manner.

Similarly, the temperature dependent use of argon and nitrogen can be applied to the preheating zone. More specifically, if in the preheating operation the temperature is below the minimum temperature at which significant nitriding will occur then nitrogen will be injected therein. On the other hand, if the temperature in the preheating zone is above the minimum temperature at which significant nitriding will occur, then argon will be injected therein.

In another embodiment of the present invention there is injected substantially only nitrogen at both the entrance and exit ends of the heat treating apparatus. A reducing agent alone or in combination with a portion of argon is injected in the reaction zone and substantially only argon is injected between the reaction zone and the respective entrance and exit ends of the furnace. In this arrangement, nitrogen is substantially prevented from entering the reaction zone so that nitriding in the presence of the reducing agent is substantially avoided. In addition, argon and not nitrogen is used to control the reducing capacity of the reducing agent.

Figure 1:
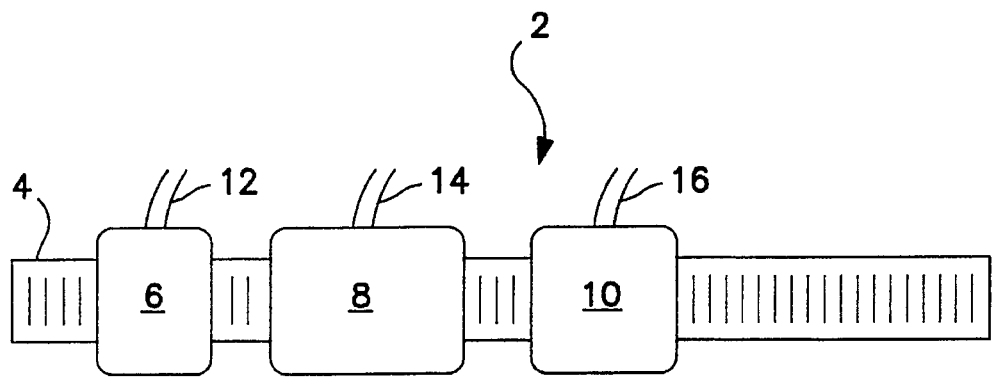
FIG. 1 is a schematic view of one embodiment of the heat treating system of the present invention employing a single preheating zone and a single cooling zone.

Referring to FIG. 1 there is shown a heat treating furnace 2 including a conveyor belt 4 passing through a preheating zone 6, a reaction zone 8, and a cooling zone 10.

The preheating zone 6 receives the metal to be treated and raises the temperature slowly and uniformly to prevent warpage. In addition, preheating serves to burn-off organic materials such as brazing paste binders and surface residual oils. For most applications, the temperature of the preheating zone does not exceed 1400° F.

The preheating zone 6 is provided generally with an atmosphere suitable for preheating the metal without undue side reactions such as oxidation. It is therefore preferred that preheating take place in a substantially inert atmosphere such as nitrogen which is provided through a nozzle 12 from a source (not shown) or from some other conventional injection system.

The preheated metal leaves the preheating zone 6 and enters the reaction zone 8. The reaction zone typically operates at temperatures of at least 1000° F. and typically much higher. At these temperatures the presence of nitrogen can cause nitriding. The present process therefore avoids nitrogen in the reaction zone. Accordingly, a reducing gas is the principal component of the atmosphere provided in the reaction zone which is provided through a nozzle 14 or other conventional injection system. If better control over the reducing capacity of the atmosphere is required, then a portion of argon may be provided through the same nozzle 14 or a different nozzle or injection system (not shown) to reduce the concentration of the reducing gas and thereby the reducing power thereof.

The heat treated metal exiting the reaction zone 8 enters the cooling zone 10. Argon or nitrogen will be injected into the cooling zone 10 through a nozzle 16 or other similar device. The selection of argon or nitrogen will depend on the temperature within the cooling zone 10. If the temperature within the cooling zone 10 is less than the minimum temperature at which nitriding will occur (e.g. 1000° F.), then nitrogen will be injected therein through the nozzle 16. If, however, the temperature is above the minimum temperature at which nitriding will occur then argon will be injected. The resulting heat treated metal passes out of the heat treating apparatus without significant nitriding.

The heat treating apparatus can be provided with multiple cooling regions in which the cooling zone closest to the reaction zone may be provided with an atmosphere of argon and the more distant cooling region receiving the partially cooled metal may be provided with a nitrogen atmosphere.

Figure 2:
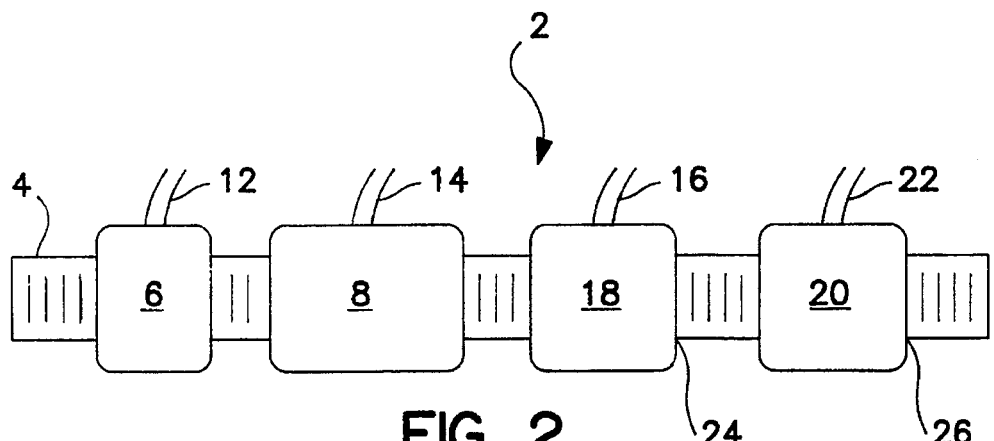
FIG. 2 is a schematic view of another embodiment of the invention employing multiple cooling zones.

Referring to FIG. 2, the preheating zone 6 and the reaction zone 8 and their operation are as described in connection with the embodiment of FIG. 1. In this second embodiment, the heat treated metal exiting the reaction zone 8 enters a first cooling zone 18. Argon is provided through a nozzle 16 or other conventional injection system, in an amount sufficient to entirely blanket the metal and to substantially prevent any nitrogen from entering the reaction zone 8 from the first cooling zone 18. The metal therefore is not exposed to nitrogen in the first cooling zone 18 where temperatures above the minimum necessary to cause nitriding can occur.

The second cooling zone 20 can be a separate structure as shown specifically in FIG. 2 or may be in the same housing. If both cooling zones 18, 20 are within the same housing, the zones may optionally be separated by a curtain (not shown). If curtains are employed to separate the first and second cooling zones 18, 20 they may be made of a heat resistant ceramic fiber or cloth.

The second cooling zone 20 is injected with nitrogen only. The inert atmosphere presented by the nitrogen gas prevents air from entering the furnace and provides a low cost means of preventing any oxidation from occurring which may adversely affect the heat treated metal. Nitrogen is used in the second cooling zone 20 because of its low cost and because the temperature therein is typically below the threshold for causing nitriding.

The process of the present invention may also be provided with nitrogen and/or oxygen sensing devices. A nitrogen sensing device 24 is positioned at the exit end of the first cooling zone 18. The concentration of nitrogen is detected in this location and the amount of argon injected therein is sufficient to ensure that only a minimum amount of nitrogen migrates from the second cooling zone 20 back into the first cooling zone 18. Nitrogen sensing devices and their operation are well known and are commercially available (e.g. Rascal II, Model #00800-502-20 manufactured by Ohmeda Medical Systems, a Division of Ohmeda Inc. ).

An oxygen sensing device 26 is positioned at the exit end of the second cooling zone 20 to measure the concentration of oxygen therein to ensure that substantially no air enters through the opening at the exit end thereby allowing the process to be run with the minimum amount of nitrogen.

The oxygen content at the exit of the second cooling zone 20 is monitored and, based on the oxygen level, the nitrogen injection rate is adjusted to maintain the oxygen level below a predetermined value. Oxygen sensing devices of the type employed in this embodiment of the invention are well known, such as, for example, Model #2550 manufactured by Illinois Instruments.

In another embodiment of the invention, the preheating zone is divided into two sections based on the type of gaseous atmosphere present therein. It shall be understood, however, that preheating may take place in a single section. As previously indicated, the present process provides for the injection of nitrogen and argon depending on the temperature within the preheating zone in a manner that avoids significant nitriding.

Figure 3:
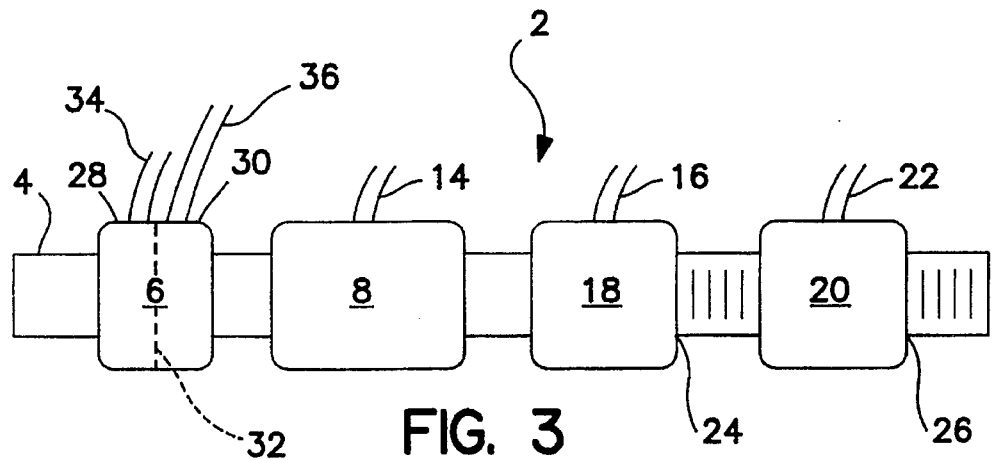
FIG. 3 is a schematic view of still another embodiment of the invention employing multiple preheating zones and multiple cooling zones.

Referring to FIG. 3, the preheating zone 6 therefore has a first section 28 which is provided with substantially only nitrogen. Nitrogen is injected into the first section 28 of the preheating zone 6 because it is insulated from the reaction zone 8 and the temperature therein is insufficient to instigate nitriding on the metal surface (e.g. is generally less than 1000° F.).

The preheating zone 6 has a second section 30 which typically operates at a temperature of up to 1400° F. Unlike the first preheat section 28, the second section 30 is provided with substantially only argon since temperatures in this section are typically high enough to result in significant nitriding (e.g. generally above 1000° F.). The injection of only argon substantially prevents nitrogen from the first section 28 from diffusing into the reaction zone 8 where temperatures are generally considerably above 1200° F.

Separation of the respective atmospheres of the first section 28 and the second section 30 of the preheating zone 6 may be enhanced by use of a curtain 32, made of heat resistant ceramic fiber or cloth.

The respective gases (nitrogen and argon) are provided to the preheat sections 28, 30 through conventional injection systems 34 and 36, respectively from a source as described previously in connection with the reaction and cooling zones (not shown). The injection of nitrogen in the preheat section 28 and argon in the preheat section 30 is at a rate sufficient to maintain the atmospheres at the desired concentrations so that significant nitriding does not take place.

The reaction zone 8 and the cooling zones 18 and 20 are operated in the same manner as described above in connection with FIG. 2. It should be understood that the embodiment of FIG. 3 herein can be operated with a single cooling zone as discussed in connection with the embodiment of FIG. 1. In accordance with the invention, nitrogen is substantially eliminated from the reaction zone 8 and from those areas where significant nitriding occurs. Accordingly, the present process may be conducted at a commercially acceptable cost level. It is expected that the total amount of argon employed in the process by injection into the heat treating apparatus is from about 10 to 50% by volume, the amount of nitrogen from about 30 to 70% by volume and the amount of the reducing gas (e.g. hydrogen) from about 5 to 50% by volume.

EXAMPLE 1

A Drever 6" continuous belt furnace having the configuration generally shown in FIG. 1 was employed to braze stainless steel parts. Five inlets were provided in the furnace for selectively injecting argon, nitrogen and hydrogen gas. The first inlet appeared in advance of the preheating zone, the second inlet between the preheating zone and the reaction (hot) zone, a third inlet downstream of the exit end of the reaction zone, a fourth inlet in the first cooling zone and a fifth inlet in the second cooling zone located at the terminal end of the furnace.

The furnace was operated such that the preheating zone had an average temperature of about 1000° F. and the reaction zone had an average temperature of about 2050° F. 125 standard cubic feet per hour (SCFH) of nitrogen was injected into the first inlet, 50 SCFH of argon was injected into the second inlet, 50 SCFH of argon and 75 SCFH of hydrogen was injected into the third inlet, 75 SCFH of argon was injected into the fourth inlet and 125 SCFH of nitrogen was injected into the fifth inlet for a total flow of injected gas of 500 SCFH.

A flame was lit at the furnace entrance to burn off existing hydrogen, thereby creating a region of high temperature and low pressure at the furnace entrance. The nitrogen concentration was measured in three different locations in the reaction zone using mass spectrometry and found to be in the range of from 2.1 to 4.7% by volume. The parts brazed under these conditions were very shiny indicating that no significant amount of nitriding had taken place.

COMPARATIVE EXAMPLE

The furnace employed in Example 1 was operated under the same conditions as set forth in Example 1 for brazing stainless steel parts except that all of the argon injected into the furnace was replaced by nitrogen. The amount of nitrogen in the reaction zone was calculated to be about 75% by volume based on the methods and results disclosed in H.S. Nayar et al., "The Effect of Sintering on the Corrosion Resistance of 316L Stainless Steel", Progress in Powder Metallurgy vol. 37 pp 1–7 (19__), incorporated herein by reference. This large concentration of nitrogen in the reaction zone is highly likely to result in significant nitriding of the heat treated parts.

A computational fluid dynamics (CFD) based model was developed for a 6 inch belt furnace for the purpose of establishing model gas flows and resulting atmosphere profiles in the furnace. The model was validated by comparing the model predicted atmosphere composition against the atmosphere composition actually measured by taking a gas sample from that location and analyzing the gas sample for percentage nitrogen, percentage hydrogen, ppm oxygen and balance argon. Analysis of the gas samples was done using mass spectrometry. Once the model was validated, it was used as set forth in the following examples.

EXAMPLE 2

Figure 4:
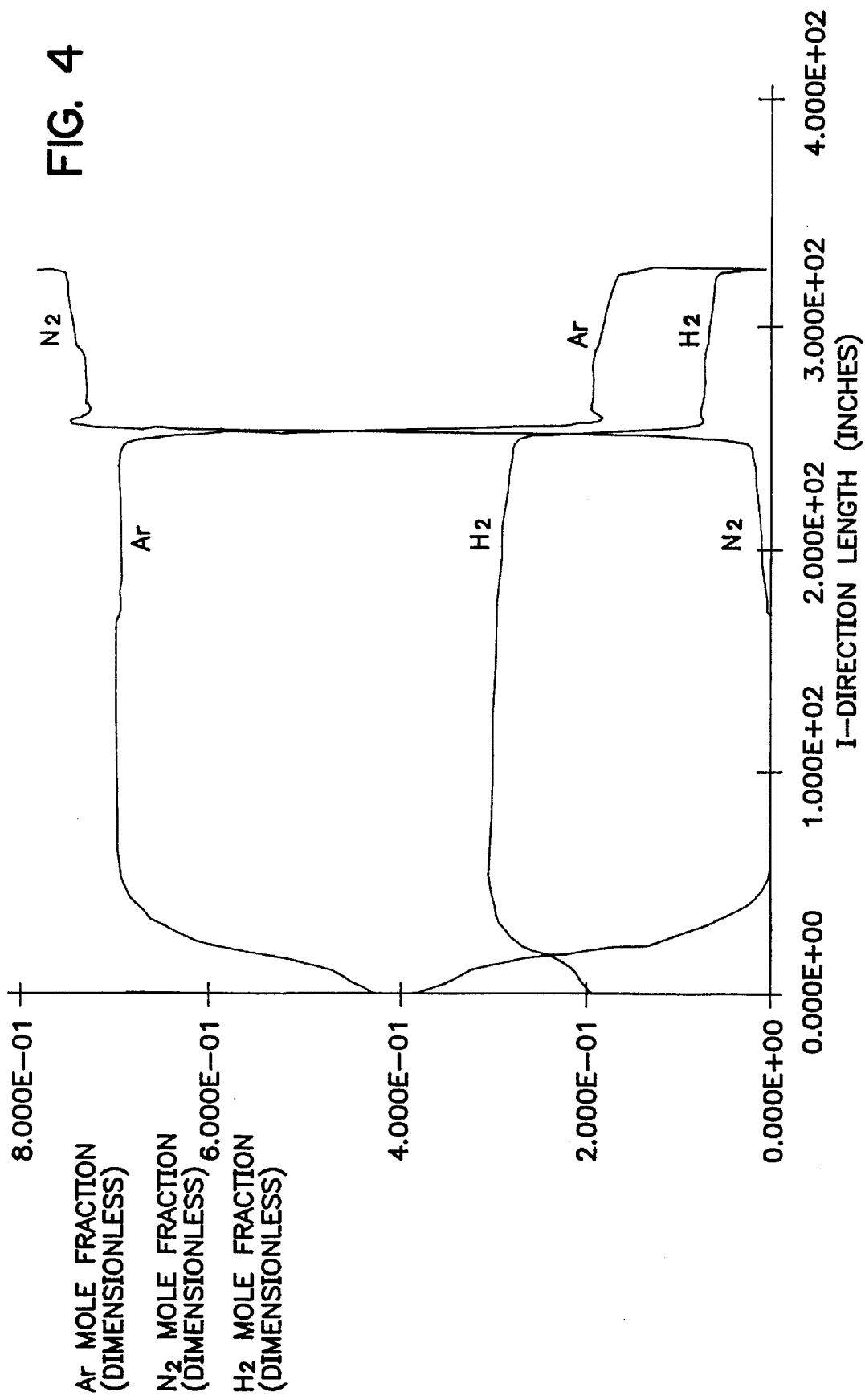
FIG. 4 is a graph showing a profile of gases within a furnace in accordance with an embodiment of the present invention.

The same 6 inch belt furnace used in Example 1 was used to inject 125 SCFH nitrogen, 0 SCFH argon (75 SCFH hydrogen+175 SCFH argon) 0 SCFH argon and 125 SCFH nitrogen respectively, into the five atmosphere inlets. The total gas flow is therefore 500 SCFH. The resulting atmosphere profile is shown in FIG. 4, where the mole fraction of nitrogen, hydrogen and argon are plotted as a function of distance from the furnace inlet. As shown in FIG. 4, nitrogen levels are below 1% by volume between distances 60 inches and 170 inches from the furnace inlet. This zone of the furnace, where nitrogen levels are below 1% by volume can be termed the "zone of integrity". In this example, the zone of integrity is 110 inches long and is where the temperature is above 1000° F. Thus, although the zone of integrity has temperatures high enough to produce nitriding, no nitriding occurs because the level of nitrogen therein is kept at very low levels.

EXAMPLE 3

Figure 5:
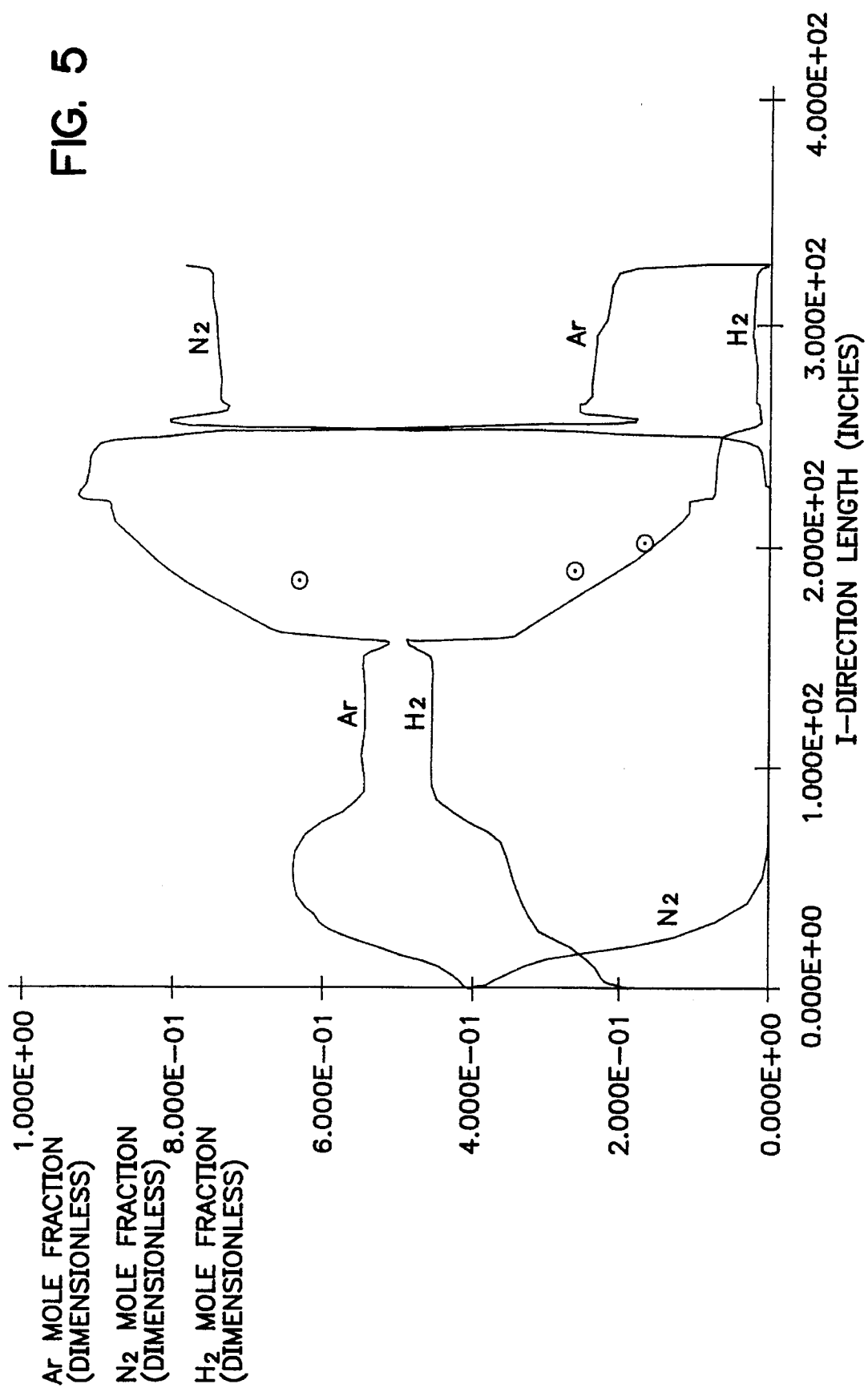
FIG. 5 is a graph showing a profile of gases within a furnace in accordance with another embodiment of the present invention.

The same 6 inch belt furnace used in Example 1 was used to inject 125 SCFH nitrogen, 50 SCFH argon, (75 SCFH hydrogen+50 SCFH argon), 75 SCFH argon and 125 SCFH nitrogen respectively. The total gas flow rate is 500 SCFH. The resulting model predicted atmosphere is shown in FIG. 5. As shown in FIG. 5, the nitrogen free zone of integrity is 165 inches long, extending between 60 inches and 225 inches of the furnace. The gas flows provided herein are likely to eliminate or at least keep nitriding to a very low level. This example provides a much longer "zone of integrity" as compared to that in Example 2. The economics are similar in both examples.

EXAMPLE 4

Figure 6:
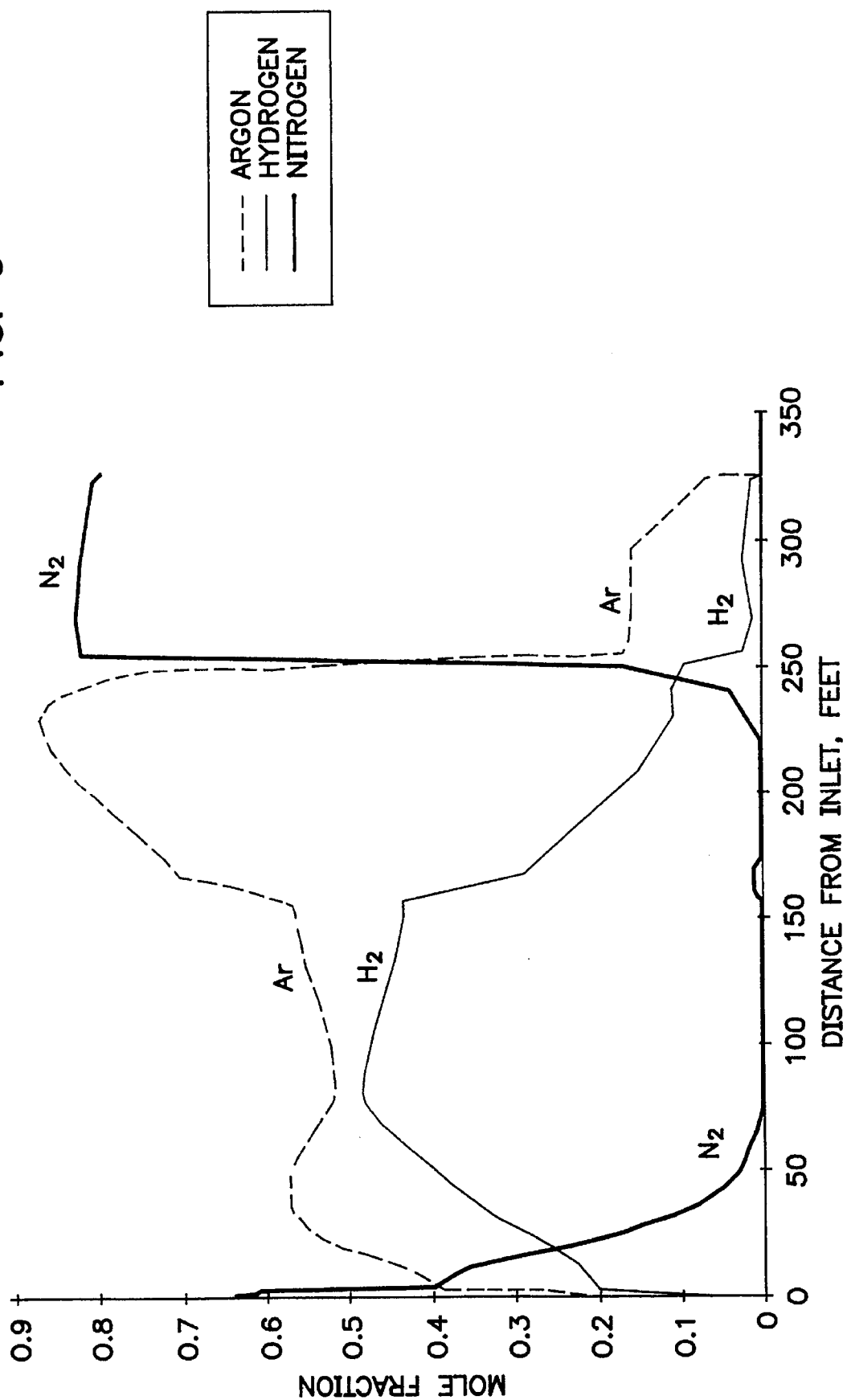
FIG. 6 is a graph showing a profile of gases within a furnace in accordance with a further embodiment of the present invention.

The same 6 inch belt furnace used in Example 1 was used to inject 125 SCFH nitrogen, 0 SCFH argon, (75 SCFH hydrogen+75 SCFH argon), 75 SCFH argon and 150 SCFH nitrogen respectively. The total gas flow rate is 500 SCFH. In this example the total argon injected is reduced by 25 SCFH compared to Example 3, while the nitrogen flow has been increased by 25 SCFH as compared with Example 3. The resulting model predicted atmosphere is shown in FIG. 6. As shown in FIG. 6, the nitrogen free zone of integrity is still 165 inches long; extending between 60 inches and 225 inches of the furnace. The gas flows provided in this example are likely to eliminate or at least keep nitriding to a very low level. This example provides an economic advantage over the process of Example 3 because less of the more expensive argon gas is used.

We claim:

1. A method of heat treating a metal comprising:
   a) preheating the metal in a preheating zone of a heat treating apparatus;
   b) passing the preheated metal to a reaction zone of the heat treating apparatus and heating the preheated metal to a temperature of at least 1000° F. in an atmosphere substantially free of nitrogen; and
   c) cooling the heated metal in a cooling zone of the heat treating apparatus while injecting substantially only argon into the cooling zone when the temperature is above the temperature at which the metal will undergo significant nitriding and injecting substantially only nitrogen when the temperature is below the temperature at which the metal will undergo significant nitriding.

2. The method of claim 1 comprising preheating the metal in the presence of nitrogen.

3. The method of claim 1 wherein the step of preheating the metal comprises injecting substantially only nitrogen into the preheating zone when the temperature is below the temperature at which the metal will undergo significant nitriding and injecting substantially only argon when the temperature is above the temperature at which the metal will undergo significant nitriding.

4. The method of claim 1 comprising heating the preheated metal in the presence of a reducing gas.

5. The method of claim 1 comprising heating the preheated metal in the presence of a reducing gas.

6. The method of claim 4 wherein the reducing gas is hydrogen.

7. The method of claim 1 wherein the step of preheating comprises preheating the metal in a plurality of preheating zones.

8. The method of claim 7 comprising preheating the metal in a plurality of preheating zones, wherein nitrogen or argon are, respectively, injected into each preheating zone depending on whether the temperature of each preheating zone is above or below the temperature at which the metal will undergo significant nitriding.

9. The method of claim 3 comprising cooling the heated metal in a plurality of cooling zones, wherein nitrogen and argon are, respectively, injected into each cooling zone depending on whether the temperature of each cooling zone is above or below the temperature at which the metal will undergo significant nitriding.

10. The method of claim 8 comprising cooling the heated metal in a plurality of cooling zones, nitrogen and argon being injected into each cooling zone depending on whether the temperature of each cooling zone is above or below the temperature at which the metal will undergo significant nitriding.

11. The method of claim 5 wherein the total amount of gas injected into the heat treating apparatus comprises from about 30 to 70% by volume of nitrogen, from about 10 to 50% by volume of argon and from about 5 to 50% by volume of the reducing gas.

12. The method of claim 1 further comprising monitoring the amount of oxygen and nitrogen in the cooling zone.

13. The method of claim 1 comprising monitoring the amount of nitrogen in the cooling zone and, when the temperature is above that at which the metal will undergo significant nitriding, adjusting the rate of injection of argon to maintain a predetermined level of nitrogen so that significant nitriding does not occur.

14. The method of claim 1 comprising monitoring the amount of oxygen in the cooling zone at a location therein where oxidation of the metal can occur and adjusting the rate of injection of nitrogen to maintain an oxygen level below a predetermined value so that significant oxidation of the metal does not occur.

15. The method of claim 1 further comprising injecting argon into the reaction zone.

16. The method of claim 1 wherein the metal is a nitrogen-sensitive metal.

17. The method of claim 16 wherein the nitrogen-sensitive metal is selected from the group consisting of stainless steels, titanium, titanium-containing alloys and refractory metals.

* * * * *